United States Patent

[11] 3,558,941

| [72] | Inventors | Giorgio Visconti Brebbia<br>Federico Visconti Brebbia, Via G. da<br>Procida 6, Milan, Italy |
|---|---|---|
| [21] | Appl. No. | 792,076 |
| [22] | Filed | Jan. 17, 1969 |
| [45] | Patented | Jan. 26, 1971 |
| [32] | Priority | July 4, 1968 |
| [33] | | Italy |
| [31] | | 18560A/68<br>Pat. 838574 |

[54] PERMANENT MAGNET STEPPING MOTOR WITH SINGLE WINDING
5 Claims, 9 Drawing Figs.

[52] U.S. Cl. .................................................. 310/49,
310/67, 310/154, 310/156, 310/181, 310/257
[51] Int. Cl. ....................................................... H02k 31/04,
H02k 37/00
[50] Field of Search........................................... 310/49, 67,
112, 126, 152—6, 165, 181, 257

[56] References Cited
UNITED STATES PATENTS

| 3,119,941 | 1/1964 | Guiot | 310/49 |
| 3,302,046 | 1/1967 | Brandwijk | 310/49 |
| 3,423,617 | 1/1969 | Kohlhagen | 310/49 |

Primary Examiner—W. E. Ray
Attorney—Steinberg and Blake

ABSTRACT: Electric stepping motor for pulse counting and positioning by angular increments of, for example, 36° a shaft in accordance with the number of pulses supplied to the motor, comprising a rotor formed of a permanent magnet radially magnetized according to a plurality of pole pairs, a first stator formed of a permanent magnet radially magnetized according to a plurality of pole pairs, a second electromagnetic stator having a plurality of poles, and an indented body of magnetically soft material having the configuration of a slotted disc which provides slots and teeth.

PATENTED JAN 26 1971 3,558,941
SHEET 1 OF 4
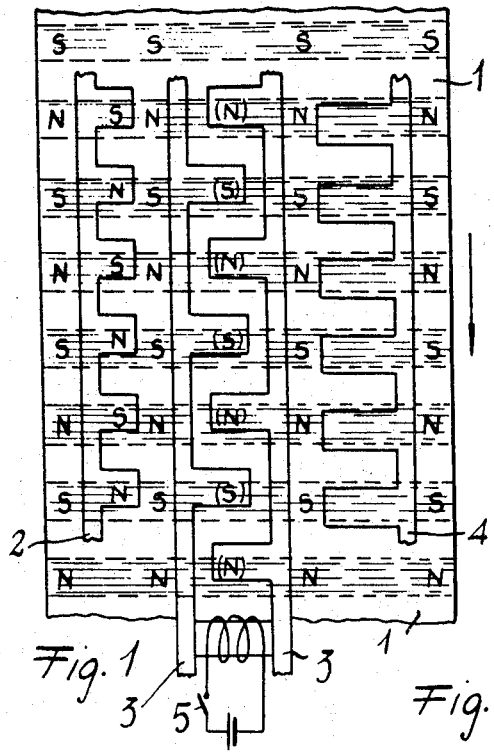
Fig. 1
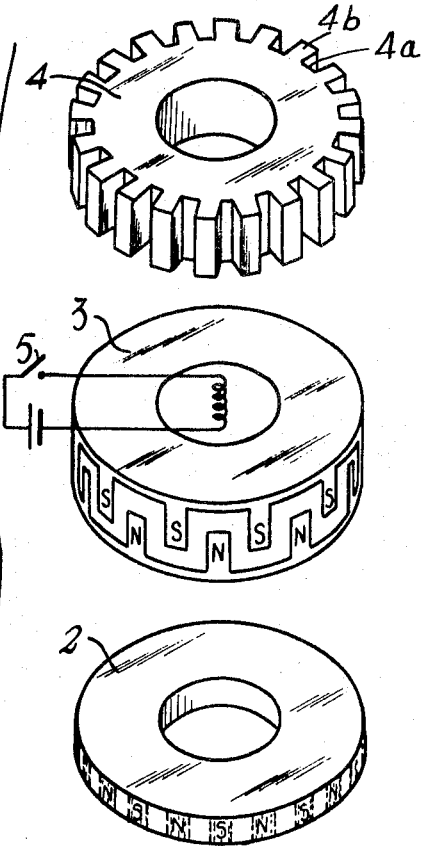
Fig. 2
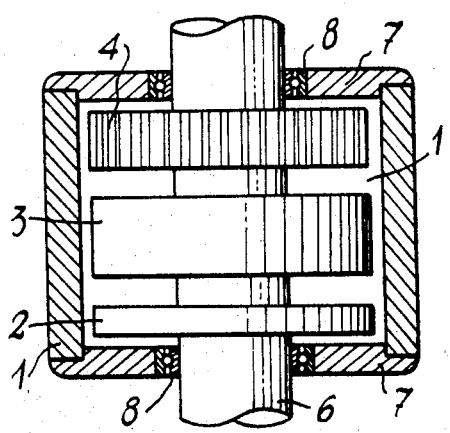
Fig. 3
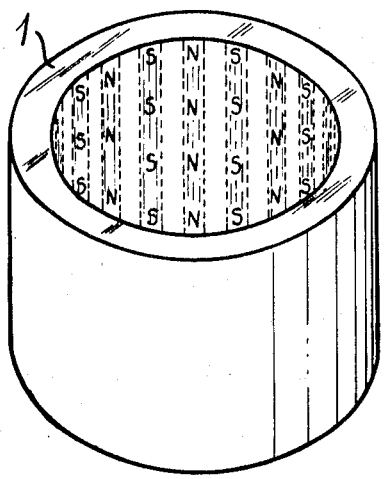
INVENTOR
GIORGIO VISCONTI BREBBIA
FEDERICO VISCONTI BREBBIA
BY
Steinberg & Blake
ATTORNEYS INVENTORS
GIORGIO VISCONTI BREBBIA
FEDERICO VISCONTI BREBBIA
BY
Steinberg and Blake
ATTORNEYS FIG.5A
FIG.5B
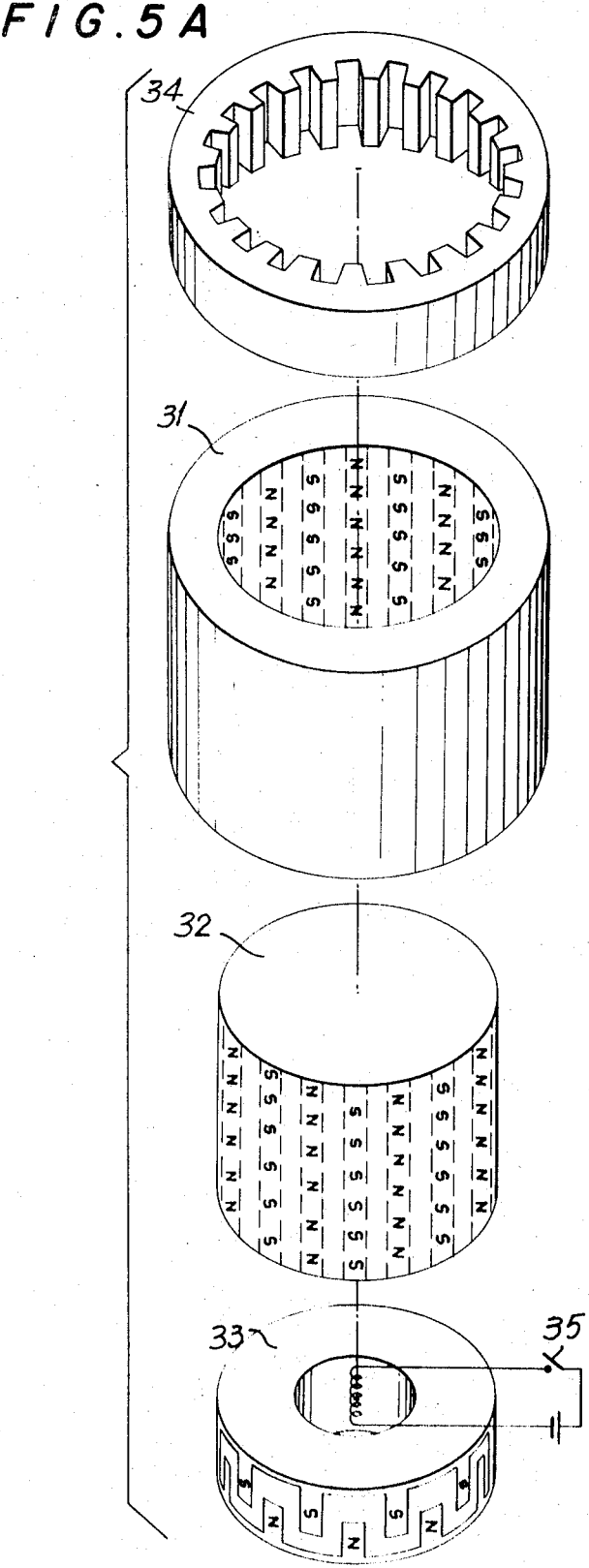
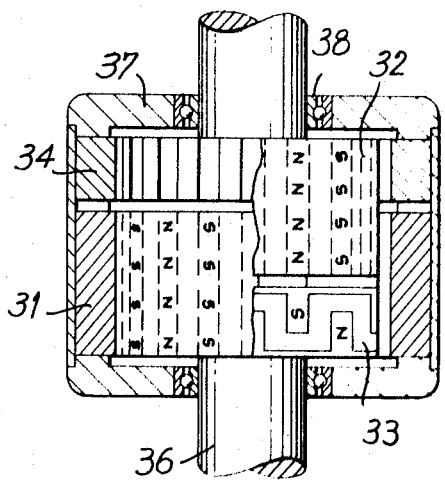
INVENTORS
GIORGIO VISCONTI BREBBIA
FEDERICO VISCONTI BREBBIA
BY
Steinberg and Blake
ATTORNEYS

3,558,941

INVENTORS
GIORGIO VISCONTI BREBBIA
FEDERICO VISCONTI BREBBIA
BY
*Steinberg and Blake*
ATTORNEYS

PERMANENT MAGNET STEPPING MOTOR WITH SINGLE WINDING

The present invention relates to an electric stepping motor for pulse counting and determining the angular position of a shaft in accordance with a number of pulses.

Conventional electric stepping motors are provided with two, three or four windings, some of which are interconnected and always supplied with positive or negative voltages applied to the windings by means of mechanical or electronic switches. Such stepping motors suffer from the following drawbacks:

a. They cannot divide the 360° revolution into any number of steps, but only into definite numbers; for example, they cannot divide the 360° revolution into 10 parts and this is prejudicial to the use thereof in decimal metering apparatus where, to obviate such a drawback, gear protractors or reporters are used between the stepping motors and decimal numerators.

b. When not energized, they are almost inert, i.e. they do not stand still at the point reached as a consequence of the received pulses, but easily move opposing a very slight torque to movements, which has nothing to do with the high torque they oppose to movements when energized; therefore, such stepping motors have to be continuously energized in order to be kept stationary.

c. For a correct energizing thereof it is practically required to use a complicated semiconductor apparatus, the cost of which is three or four times greater than that of the motors. The main object of the present invention is to provide an electric stepping motor overcoming the above drawbacks.

A further object is to provide an electric stepping motor which is of a simple structure and provided with only one winding without any tapping.

A still further object is to provide an electric stepping motor which can be supplied with pulses all of the same direction, or all of the same polarity; particularly, such a motor that operation thereof can be effected by only a cell and a simple switch.

A further object is to provide an electric stepping motor by which a full 360° revolution can be divided into any number of steps, i.e. such a motor that a step thereof can cause a rotation of any predetermined magnitude in a driven shaft.

Finally, a further object is to provide an electric stepping motor which, when not energized, will stand still at the point as reached as a consequence of the received pulses, opposing to movements the same large torque as when energized.

Such an electric motor comprises a rotor and at least two stators, the rotor comprising a permanent magnet, a surface of which is cylindrical and radially magnetized according to a plurality of pole pairs, the two stators comprising, respectively the first stator, a permanent magnet having the shape of a cylindrical body radially magnetized according to a plurality of pole pairs on its surface opposite to that of said rotor, and the second stator an electromagnet provided with an electric winding enclosed between two flanges of magnetically soft material and provided with fins forming the electromagnet poles, the motor comprising also an indented body made of magnetically soft material, the magnetic portions of the stators being opposite to the magnetic portions of the rotor.

In order that the structure and features of the electric stepping motor be more clearly understood, an embodiment thereof will now be described by mere way of non-restrictive example, reference being made to the accompanying drawing in which:

FIG. 1 is a magnetic diagram of a stepping motor according to the invention;

FIG. 2 is an exploded view for an embodiment of a stepping motor;

FIG. 3 is a partly sectional view showing the motor comprising the component elements of FIG. 2, said elements being shown as assembled to one another in operating conditions;

FIG. 5A is a schematic perspective exploded illustration of a further embodiment of rotor and stator assemblies of a stepping motor according to the invention;

FIG. 5B is a schematic sectional elevation showing the components of FIG. 5A assembled into the motor;

Figure 4A:
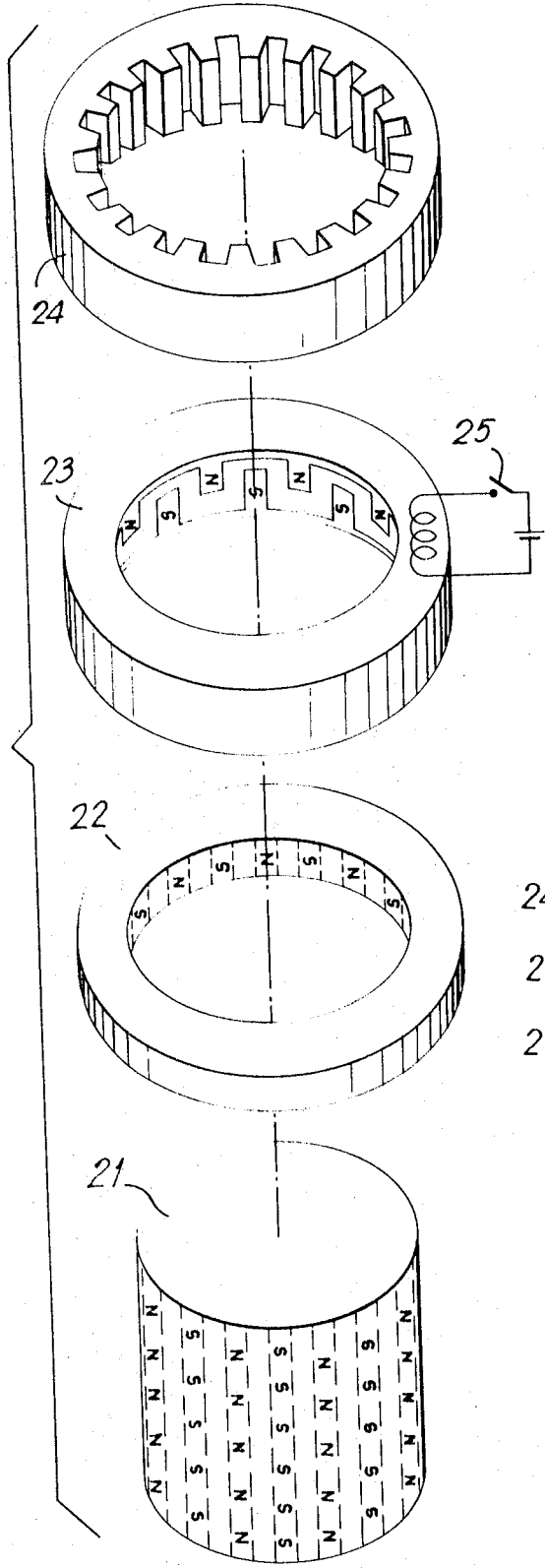
FIG. 4A is an exploded perspective illustration diagrammatically illustrating another embodiment of rotor and stator assemblies of a stepping motor of the invention.

In FIGS. 1—3 of the drawing a permanent magnet rotor is designated at 1 and three stator members are designated at 2, 3 and 4.

Rotor 1 comprises a permanent high coercitive force magnet, annularly shaped and radially magnetized according to a plurality of pole pairs on the inner surface of the hollow cylinder formed by the rotor 1, as shown in FIG. 2, the north poles being designated by letter N and the south poles being designated by letter S, respectively.

The three stator members 2, 3 and 4, fast and coaxial with one another, can be accommodated within said annular rotor 1.

In FIG. 3, showing a sectional assembled view of the motor, the three stators can be seen as secured on shaft 6 to form a stator assembly and the rotor as provided with two flanges 7 and ball bearings 8 mounted on shaft 6 to form a rotor assembly surrounding turnable with respect to the stator assembly.

Stator 2 comprises a permanent high coercitive force magnet in the form of a washer or disc and radially magnetized according to a plurality of pole pairs on the surface of the outer circumference, as schematically shown in FIG. 2.

Stator element 3 is an electromagnet comprising an electric winding enclosed between two soft iron flanges forming two-claw tooth poles of magnetically soft material, having pole pieces forming the electromagnet poles. North and south polarities, as shown in FIGS. 1 and 2, will appear only when a switch 5 is closed, which causes a flow of current in the electric winding of electromagnet 3.

Stator 4 is formed of a soft iron disc or ring of magnetically soft material, the ring being indented or slotted so as to have slots 4a and teeth 4b as shown in FIG. 2.

The number of poles for rotor 1 and stator members 2 and 3 and the number of slots or teeth for stator member 4 are the same.

All the poles and all the slots or teeth have the same width.

The poles of stator 2 and stator 3 are perfectly aligned.

The direction of the electric winding for stator member 3 is so arranged that, when energized, at the poles of stator member 3 there will appear polarities of opposite sign to that of the poles of stator member 2, as shown in FIGS. 1 and 2.

The slots or teeth of stator element 4 are forwardly displaced angularly by half a tooth with respect to the poles of stator elements 2 and 3 in the direction of rotation desired from the motor.

In FIG. 2 the teeth are clockwise displaced, thereby providing for rotation of rotor 1 in this direction.

Rotor 1 and stator 2, both of which are permanent magnets, attract each other according to opposite polarities and repel each other according to same polarities, tending to retain rotor 1 at as many fixed locations as the number of pairs of poles.

Thus, the full 360° revolution of the rotor is divided into as many steps as the number of pairs of poles; no limit is to be found in determining the number of pole pairs.

The provision of stator member 4, the slots and teeth of which are displaced by half a slot or tooth in the same direction of rotation as desired from the motor, maintains rotor 1 rotated through about one third of a pole width in the slot or tooth displacement direction.

When not energized, stator member 2, as corrected by stator 4, tends to retain by mutual action rotor 1 at as many fixed locations as the number of pairs of poles; such locations are anticipated through about one-third of a pole in the direction of motor rotation. When switch 5, shown in FIGS. 1 and 2, is closed, on stator 3 there will appear polarities opposite to those of stator 2 and of a double intensity; rotor 1 having already rotated through about one-third of pole in the desired rotation direction, is caused to perform a rotation in the desired direction until meeting with a pole of opposite sign on stator 3, in turn anticipated by stator 4 also at this location through about one-third of pole.

On switch 5 opening and magnetization on stator 3 terminating, the rotor is driven by stator 2, so that the next closest opposite polarities will mate.

A motor has been shown in the drawings as fitted with ten pairs of poles and, therefore, having steps of 36°.

Thus, in absence of current the rotor has ten steps, or one step for each 36°; in presence of current, that is during a pulse, the rotor is forward driven through 18° and at the pulse end is still forward driven through further 18°; the direction of rotation is given by the advance as determined by stator element 4.

According to a different embodiment of the motor, the slotted soft iron disc or body 4 can comprise an axially slotted or toothed ring which is secured to the rotor and coupled to the first stator (FIGS. 5A and 5B): the first and second stator members may be externally located about the outer circumference of the rotor (FIGS. 6A and 6B), or may also be located internally of the rotor surface. As apparent, the rotor can be disc-shaped and the three stator members may be annularly shaped and located externally of the rotor about the outer circumference thereof (FIGS. 4A and 4B).

It is apparent from the above description that in the embodiment of FIGS. 1—3, the stator members 2 and 3 together with the toothed body 4 form a stator assembly surrounded by the rotor assembly formed in this case by the hollow cylindrical rotor 1.

Figure 4B:
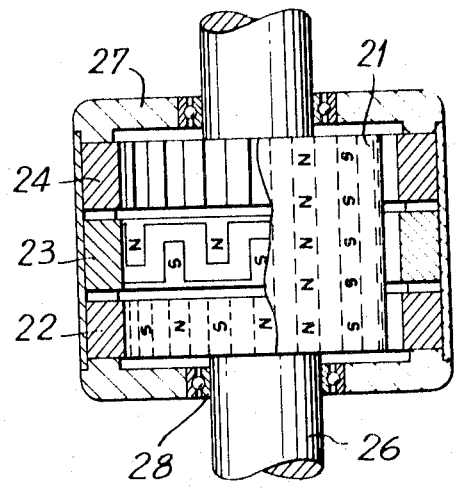
FIG. 4B is a fragmentary sectional elevation diagrammatically illustrating the components of FIG. 4A assembled into a motor.

In the embodiment of FIGS. 4A and 4B, the stator members 22 and 23 correspond to the stator members 2 and 3. The electromagnet unit 23 is actuated by the switch 25 in the manner shown schematically in FIG. 4A. The toothed body 24 corresponds to the body 4 while the rotor body 21 corresponds to the rotor 1. However, in this embodiment, the stator member 22 and 23 are carried by the flanges 27, corresponding to the flanges 7 of FIG. 3, and surround the rotor 21 which in this case is mounted on the shaft 26. In this particular embodiment the toothed body 24 is carried also by the stator assembly formed by elements 22 and 23 so that in this embodiment the tooth body 24 is connected with the stator assembly and is arranged with the latter surrounding the rotor assembly 21. In the embodiment of FIGS. 1—3 the toothed body 4 is also connected with the stator assembly 2, 3, but in this case, this latter assembly is surrounded by the rotor assembly 1.

As is apparent from FIG. 4B, the bearings 28 correspond to the bearings 8 of FIG. 3.

In the embodiment of FIGS. 5A and 5B, the stator members 32 and 33, correspond to the stator members 2 and 3 of FIGS. 1—3, with the electromagnetic stator member 33 being controlled by the switch 35 which corresponds to the switch 5. The rotor 31 corresponds to the rotor 1 and the toothed body 34 corresponds to the body 4.

However, in this case the toothed body 34 is coaxially fixed with the rotor 31 which forms the rotor assembly which surrounds the stator assembly in this embodiment, as is apparent from FIG. 5B. In this case also the stator assembly 32, 33 is fixed on the shaft 36, which through the bearings 38 and the flanges 37 supports the rotor assembly for rotary movement. However, according to this embodiment the toothed body 34 is fixed to the rotor assembly and is coupled with the stator member 32.

Figure 6A:
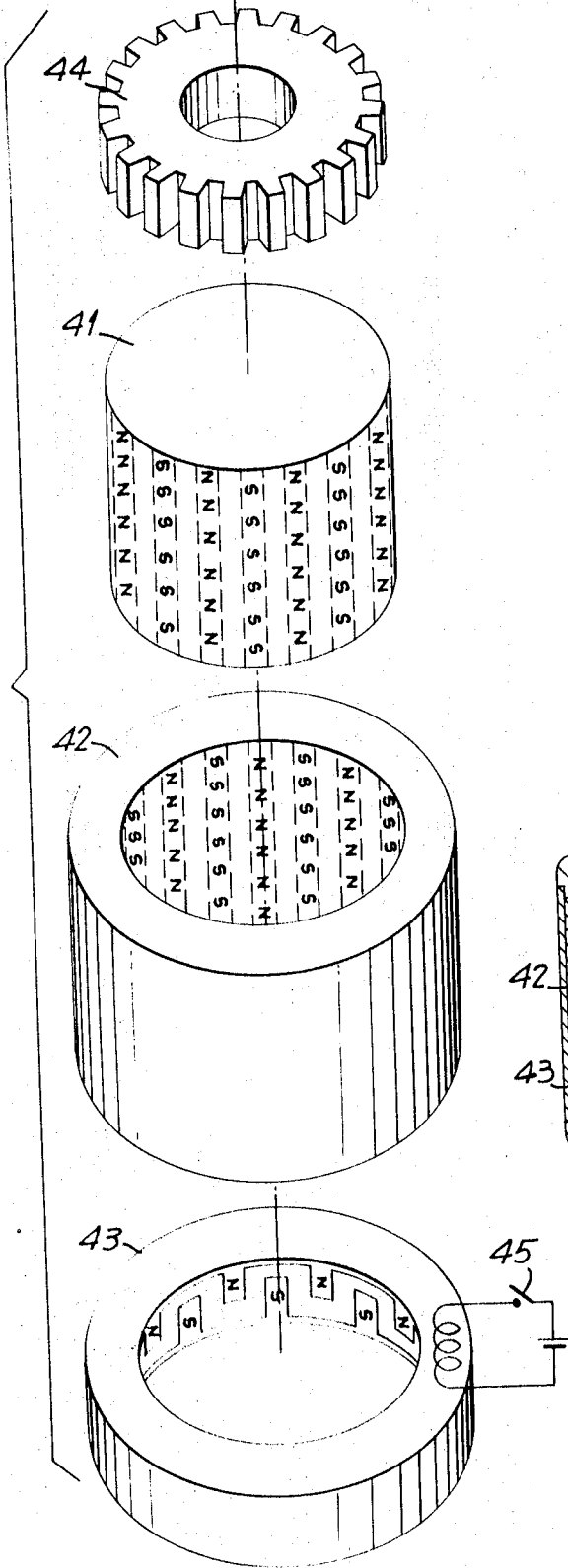
FIG. 6A is a schematic perspective exploded illustration of a further embodiment of rotor and stator assemblies of a stepping motor according to the invention.
Figure 6B:
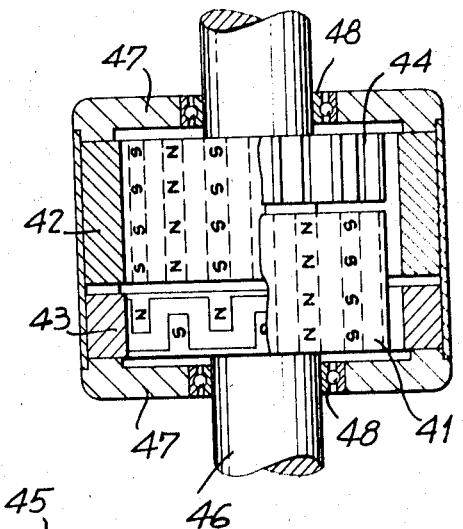
FIG. 6B is a schematic sectional elevation illustrating the components of FIG. 6A assembled into a motor.

Referring to FIGS. 6A and 6B, it will be seen that according to this embodiment the rotor assembly 41, corresponding to the rotor 1, is surrounded by the stator assembly 42, 43. The stator members 42 and 43 respectively correspond to the stator members 2 and 3, with the electromagnetic member 43 controlled by the switch 45 in the same way that the electromagnetic member 3 is controlled by the switch 5. The stator assembly 42, 43 is carried by the flanges 47 which through the bearings 48 support the rotary shaft 46 on which the rotor assembly 41 is located. In this case the toothed body 44 is coaxially fixed with the rotor assembly 41, while being coupled to the surrounding stator member 42.

As is apparent from the above description of the several embodiments, the several shafts, bearings and flanges coact to form a support means which in each case supports the rotor and stator assemblies for rotary movement one with respect to the other.

We claim:

1. An electric single-winding stepping motor for unidirectional electrical pulses, comprising coaxial rotor and stator assemblies one of which surrounds the other and a support means supporting the coaxial assemblies for rotary movement one with respect to the other, said rotor assembly including a permanent magnet, cylindrical rotor which is radially magnetized and has a predetermined number of pole pairs, while said stator assembly includes a first stator member in the form of a permanent magnet which is radially magnetized and has said predetermined number of pole pairs respectively directed toward the pole pairs of said rotor, and a second stator member in the form of an electromagnet having two-claw tooth poles and an electric winding enclosed therebetween and provided with a number of pole pieces equal to the predetermined number of poles of said rotor and first stator member and angularly aligned with the poles of said first stator member, and a toothed body of soft magnetic material having a number of pole pairs equal to that of said rotor, said toothed body being coaxially fixed with one of said assemblies.

2. The combination of claim 1 and wherein said rotor of said rotor assembly is in the form of a hollow cylinder at the inner surface of which said plurality of pole pairs are located, said toothed body being coaxially carried by said support means with said stator assembly within the interior of said rotor assembly.

3. The combination of claim 1 and wherein said toothed body is supported by said support means coaxially with said stator assembly and is situated with said stator assembly externally of said rotor assembly surrounding the latter.

4. The combination of claim 1 and wherein said toothed body is coaxially fixed with said rotor and coupled to said first stator member.

5. The combination of claim 4 and wherein said stator assembly is situated externally of and surrounds said rotor and toothed body.